United States Patent
Churin et al.

(10) Patent No.: US 12,470,686 B2
(45) Date of Patent: Nov. 11, 2025

(54) CALIBRATION OF STEREOSCOPIC DISPLAY USING WAVEGUIDE COMBINER

(71) Applicant: Microsoft Technology Licensing, LLC, Redmond, WA (US)

(72) Inventors: Dmitriy Churin, Redmond, WA (US); Parry Byron Johnson, Redmond, WA (US); Dmitry Reshidko, Sammamish, WA (US); Congshan Wan, Suzhou (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/539,216

(22) Filed: Dec. 13, 2023

(65) Prior Publication Data

US 2024/0114123 A1 Apr. 4, 2024

Related U.S. Application Data

(63) Continuation of application No. 17/648,794, filed on Jan. 24, 2022, now Pat. No. 11,876,952.

(51) Int. Cl.
*H04N 13/327* (2018.01)
*G02B 27/01* (2006.01)
(Continued)

(52) U.S. Cl.
CPC ....... *H04N 13/327* (2018.05); *G02B 27/0172* (2013.01); *H04N 13/341* (2018.05);
(Continued)

(58) Field of Classification Search
CPC .... G02B 2027/0125; G02B 2027/0132; G02B 2027/0134; G02B 2027/0178; G02B 2027/0198; G02B 27/0081; G02B 27/0172; G02B 30/22; H04N 13/327; H04N 13/341; H04N 13/344; H04N 13/363; H04N 13/398
(Continued)

(56) References Cited

U.S. PATENT DOCUMENTS 11,202,043 B1 * 12/2021 Elazhary ............ G02B 27/0176
11,876,952 B2 * 1/2024 Churin ................. H04N 13/398
(Continued)

FOREIGN PATENT DOCUMENTS

WO WO-2015081313 A2 * 6/2015 ............. G02B 17/08

*Primary Examiner* — Behrooz M Senfi
(74) *Attorney, Agent, or Firm* — Alleman Hall & Tuttle LLP (57) ABSTRACT

Examples are disclosed that relate to calibration of a stereoscopic display system of an HMD via an optical calibration system comprising a waveguide combiner. One example provides an HMD device comprising a first image projector and a second image projector configured to project a stereoscopic image pair, and an optical calibration system. The optical calibration system comprises a first optical path indicative of an alignment of the first image projector, a second optical path indicative of an alignment of the second image projector, a waveguide combiner in which the first and second optical paths combine into a shared optical path, and one or more boresight sensors configured to detect calibration image light traveling along one or more of the first optical or the second optical path.

17 Claims, 9 Drawing Sheets

(51) Int. Cl.
*H04N 13/341* (2018.01)
*H04N 13/344* (2018.01)
*H04N 13/363* (2018.01)
*H04N 13/398* (2018.01)

(52) U.S. Cl.
CPC ......... *H04N 13/344* (2018.05); *H04N 13/363* (2018.05); *H04N 13/398* (2018.05); *G02B 2027/0134* (2013.01); *G02B 2027/0178* (2013.01)

(58) Field of Classification Search
USPC .......................................................... 348/53
See application file for complete search history.

(56) References Cited

U.S. PATENT DOCUMENTS

2014/0063055 A1\* 3/2014 Osterhout ............ G02B 27/017
345/633
2017/0295362 A1\* 10/2017 Travis .................. H04N 13/128

\* cited by examiner

CALIBRATION OF STEREOSCOPIC DISPLAY USING WAVEGUIDE COMBINER

CROSS REFERENCE TO RELATED APPLICATIONS

This application is a continuation of U.S. patent application Ser. No. 17/648,794, filed Jan. 24, 2022, the entirety of which is hereby incorporated herein by reference for all purposes.

BACKGROUND

A head mounted display (HMD) device may display virtual reality (VR) content and/or augmented reality (AR) content to a user. VR and/or AR content can be displayed as a stereoscopic image pair such that an image for the right eye and an image for the left eye have slightly different perspectives. When both images of the stereoscopic image pair are viewed together, an impression of depth can be created.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to calibration of a stereoscopic display system of an HMD via an optical calibration system comprising a waveguide combiner. One example provides an HMD device comprising a first image projector configured to project a first image of a stereoscopic image pair, a second image projector configured to project a second image of the stereoscopic image pair, and an optical calibration system. The optical calibration system comprises a first optical path indicative of an alignment of the first image projector, a second optical path indicative of an alignment of the second image projector, a waveguide combiner in which the first optical path and the second optical path combine into a shared optical path, and one or more boresight sensors. Each boresight sensor is configured to detect calibration image light traveling along one or more of the first optical or the second optical path. The HMD device further comprises a controller configured to adjust one or more of the first image of the stereoscopic image pair and the second image of the stereoscopic image pair based at least in part on an output of the one or more boresight sensors.

DETAILED DESCRIPTION

As mentioned above, HMD devices may display VR content and/or AR content by projecting a stereoscopic image pair comprising separate images for a left eye and a right eye of a user. The separate images can be generated via separate image projectors on the HMD device. The focusing distance to the displayed content (accommodation) is configured to match with the perceived distance of the stereoscopic image (vergence). However, misalignment between the separate image projectors may cause a misalignment of the images of the stereoscopic image pair. This may cause vergence-accommodation conflict and thereby impact a user experience.

One solution to avoiding problems from misaligned stereoscopic image display is to utilize a highly rigid frame for the HMD device on which left-eye and right-eye projectors are mounted in fixed locations. A rigid frame may help to maintain a known alignment between the separate image projectors. However, such a rigid form factor may be bulky and/or heavy.

A smaller form factor, such as a glasses form factor, may provide for a lighter weight, more natural user experience. However, temperature changes, physical shock, physical stress, and/or other factors may cause such a smaller form factor to bend, which may cause the aforementioned misalignment between the separate image projectors. As one possible solution to address possible misalignment, an inertial measurement unit (IMU) may be rigidity mounted to each of the separate image projectors to track a relative change of alignment of each of the separate image projectors. Appropriate corrections may be applied to a displayed image based upon a tracked change in alignment of a projector. However, the IMUS may not provide sufficiently precise measurements. Further, measurement accuracy may degrade over time (e.g. due to drift).

Another solution may be to utilize a boresight sensor to sense optical path alignment. The term "boresight sensor" is used herein to refer to any suitable sensor used to detect a calibration image. Images from left-eye and right-eye projectors may be directed along both a viewing optical path and a calibration optical path. In the calibration optical path, a prism may combine images from the separate image projectors, and direct the images to a same boresight sensor for comparison. However, such a prism may be too bulky to fit in a glasses form factor.

Accordingly, examples are disclosed that relate to an HMD comprising an optical calibration system including a waveguide combiner in which a first optical path and a second optical path combine into a shared optical path. Briefly, the first optical path indicates alignment of a first image projector, and the second optical path indicates an alignment of a second image projector. The first image projector is configured to project a first image of a stereoscopic image pair and the second image projector is configured to project a second image of the stereoscopic image pair. In some examples, a boresight sensor can detect a first calibration image and a second calibration image transmitted respectively along the first and second optical paths that are delivered via the shared optical path. In other examples, a first boresight sensor can detect a calibration image transmitted from the shared optical path along the first optical path, and a second boresight sensor can detect the calibration image transmitted from the shared optical path along the second optical path. Further, a controller may be configured to adjust one or more of the first image of the stereoscopic image pair and the second image of the stereoscopic image pair based at least in part on an output of the one or more boresight sensors. The waveguide combiner may enable the use of a smaller device form factor than a prism, and thereby allow stereoscopic display system calibration to be maintained in an HMD with a compact form factor.

Figure 1:
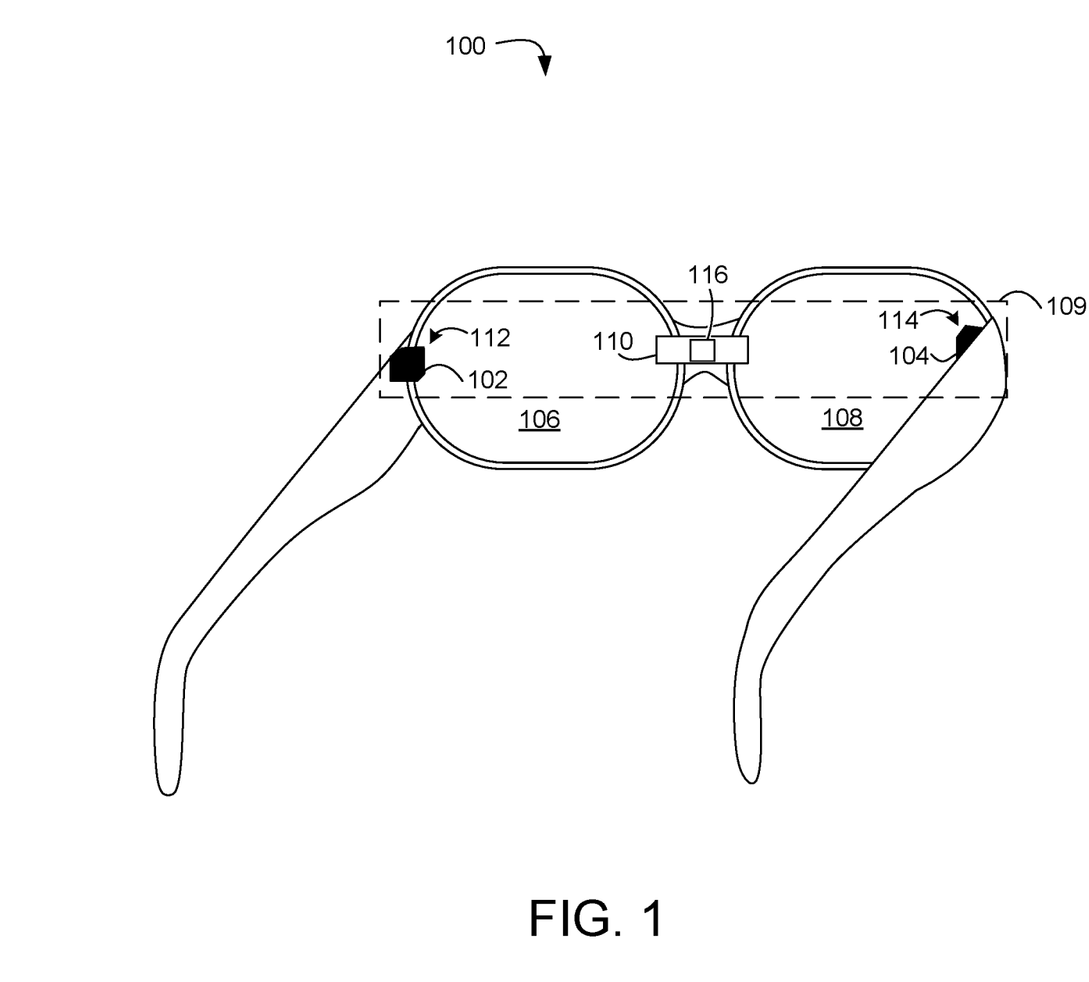
FIG. 1 shows an example HMD device.

FIG. 1 shows an example HMD device 100 configured as a pair of glasses. HMD device 100 comprises a first image projector 102, a second image projector 104, a first image projection waveguide 106, a second image projection waveguide 108, and an optical calibration system 109 comprising a waveguide combiner 110 and a boresight sensor. First image projector 102 is configured to project a first image of a stereoscopic image pair, and second image projector 104 is configured to project a second image of the stereoscopic image pair. First image projection waveguide 106 is configured to transmit and output the first image of the stereoscopic image pair for viewing, and second image projection waveguide 108 is configured to transmit and output the second image of the stereoscopic image pair for viewing. The stereoscopic images may comprise AR content, VR content, or any other suitable content. Where the stereoscopic images comprise AR content, first image projection waveguide 106 and second image projection waveguide 108 may be configured as transparent optical combiners that combine the displayed content with a view of a real-world background.

In the depicted example, waveguide combiner 110 is located in a nose bridge of the HMD device 100. Waveguide combiner 110 can have a more compact form factor than a prism, and thus may fit within the depicted form factor more easily than a prism.

In some examples, optical calibration system 109 may comprise a first calibration light source located at 112, a second calibration light source located at 114, and a boresight sensor located at 116 to detect calibration image light. In other examples, optical calibration system 109 may comprise a calibration light source located at 116, a first boresight sensor located at 112 to detect calibration image light, and a second boresight sensor located at 114 to detect calibration image light. Each calibration light source may be configured to output a calibration image. Each calibration image may take any suitable form, such as a single spot of light, a pattern (e.g. of points or and/or lines), or more complex images. Further, each boresight sensor(s) may comprise any suitable light sensor. Examples of suitable light sensors include cameras, quadrant diode detectors, angular sensitive pixel detectors, and lensless cameras.

Figure 2:
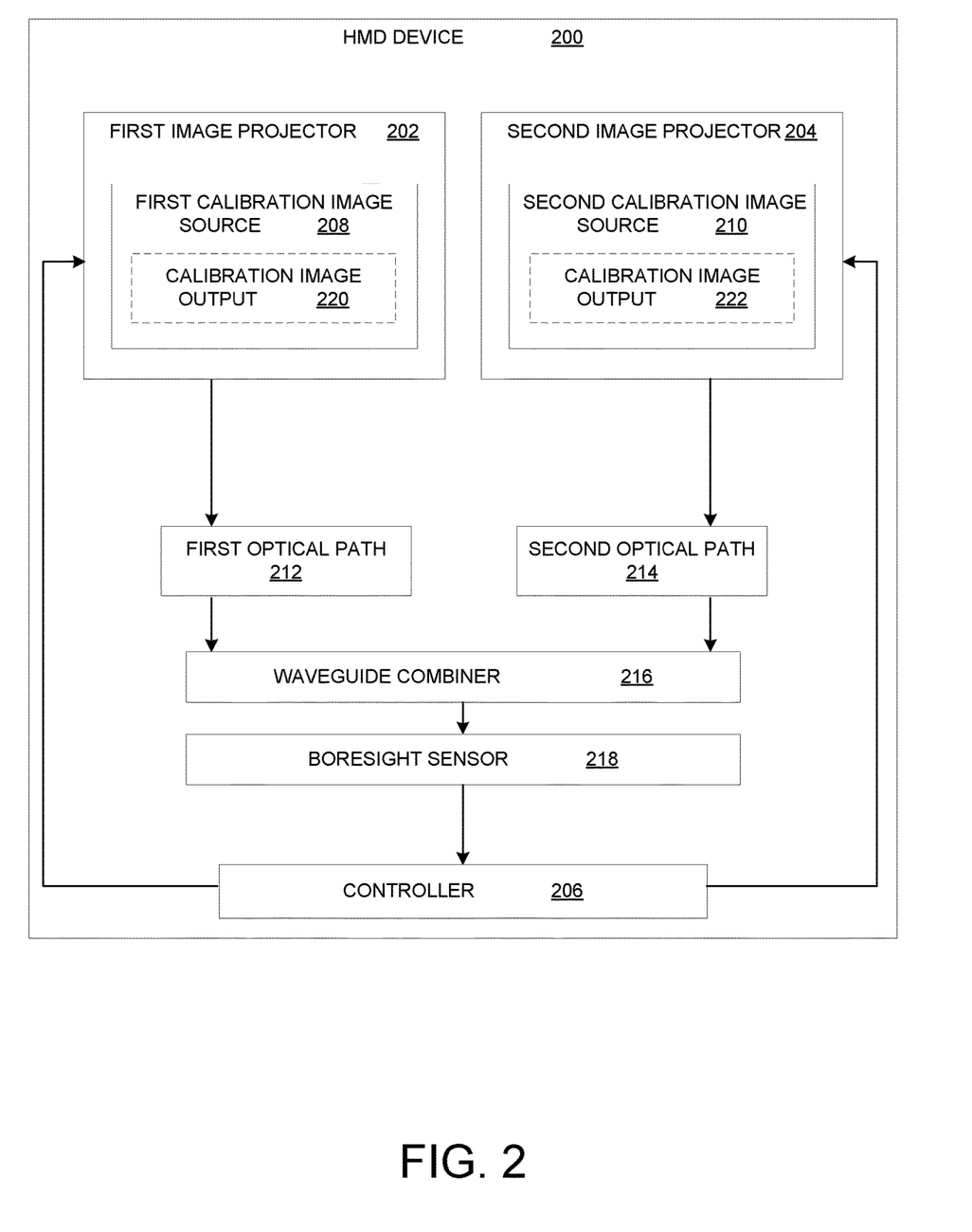
FIG. 2 shows a block diagram of an example HMD device.

FIG. 2 shows a block diagram of an example HMD device 200. HMD device 100 in some examples can be an implementation of HMD device 200. HMD device 200 comprises a first image projector 202, a second image projector 204, an optical calibration system, and a controller 206. The optical calibration system comprises a first calibration image source 208, a second calibration image source 210, a first optical path 212, a second optical path 214, a waveguide combiner 216, and a boresight sensor 218. In this example, first calibration image source 208 and second calibration image source 210 are integrated with first image projector 202 and second image projector 204. Thus, an alignment of calibration images from first calibration image source 208 and second calibration image source 210 is indicative of an alignment of first image projector 202 and second image projector 204.

First image projector 202 is configured to project a first image of a stereoscopic image pair. Second image projector 204 is configured to project a second image of the stereoscopic image pair. First calibration image source 208 is configured to output a first calibration image along first optical path 212. Similarly, second calibration image source 210 is configured to output a second calibration image along second optical path 214. First optical path 212 extends between first calibration image source 208 and boresight sensor 218. Similarly, second optical path 214 extends between second calibration image source 210 and boresight sensor 218.

In some examples, first calibration image source 208 and second calibration image source 210 may be configured to output infrared light. The use of infrared light may help to avoid any risk of the first calibration image and the second calibration image being noticeable by a user. In other examples, first calibration image source 208 and second calibration image source 210 may output visible light. Various strategies may be used to help prevent the first and second calibration images from being noticeable by a user. For example, first calibration image source 208 and second calibration image source 210 each can output a calibration image and stereoscopic images for user content in a time-multiplexed manner. In some such examples, each calibration image may be allocated 2-10 percent of display time and the user content (stereoscopic imagery) may be allocated 90-98 percent of the projector time. In such examples, the calibration image may appear to have a lower brightness than the stereoscopic user content, and thus be less noticeable. Alternatively or additionally, the first calibration image and the second calibration image each may be located at a periphery of, or outside of, a field of view of a user. Further, as described in more detail below, in other examples the calibration image and the content images can be transmitted through spatially separated optical paths.

First calibration image source 208 and second calibration image source 210 each may take any suitable form. In some examples, first calibration image source 208 comprises a calibration image output 220 of first image projector 202, and second calibration image source comprises a calibration image output 222 of second image projector 204. First calibration image source 208 and second calibration image source 210 may utilize any suitable image source. Examples include one or more light emitting diodes (LEDs), one or more lasers, an image-producing panel such as a spatial light modulator (SLM) (e.g. a liquid crystal on silicon (LCoS) microdisplay) or an organic light-emitting diode (OLED) microdisplay. In other examples, a calibration image may be output from a same output as stereoscopic image content for viewing.

First optical path 212 and second optical path 214 combine into a shared optical path in waveguide combiner 216. Boresight sensor 218 is configured to detect the first calibration image and the second calibration image as output from the shared optical path. Controller 206 is configured to adjust one or more of the first image of the stereoscopic image pair or the second image of the stereoscopic image pair based at least in part on an output of boresight sensor 218. Such a configuration may help to maintain an alignment between the first image of the stereoscopic image pair and the second image of the stereoscopic image pair. In some examples, controller 206 may be configured to detect a relative difference of the first calibration image or the second calibration image from an expected location. In some such examples, the first calibration image and the second calibration image may be configured as spatially overlapping images, and the controller 206 may determine a relative difference between sensed locations of the first calibration image and the second calibration image. Further, in some examples, controller 206 can determine an absolute angular deviation of first optical path 212 and second optical path 214 with regards to an original factory calibration and/or a relative angular disparity between first optical path 212 and second optical path 214, as described below. An alignment between the first optical path 212 and the second optical path 214 may be updated at any suitable frequency to help to maintain a stable relative angle during operation of HMD device 200.

The first calibration image and the second calibration image may be presented in any suitable manner to be distinguishable from one another. For example, the first calibration image and the second calibration image may be spatially separated, temporally separated, and/or comprise different appearances. In some examples where the first calibration image and the second calibration image are temporally separated, controller 206 can be configured to control projection of the first calibration image and the second calibration image in a time multiplexed manner, as described in more detail below.

Figure 3:
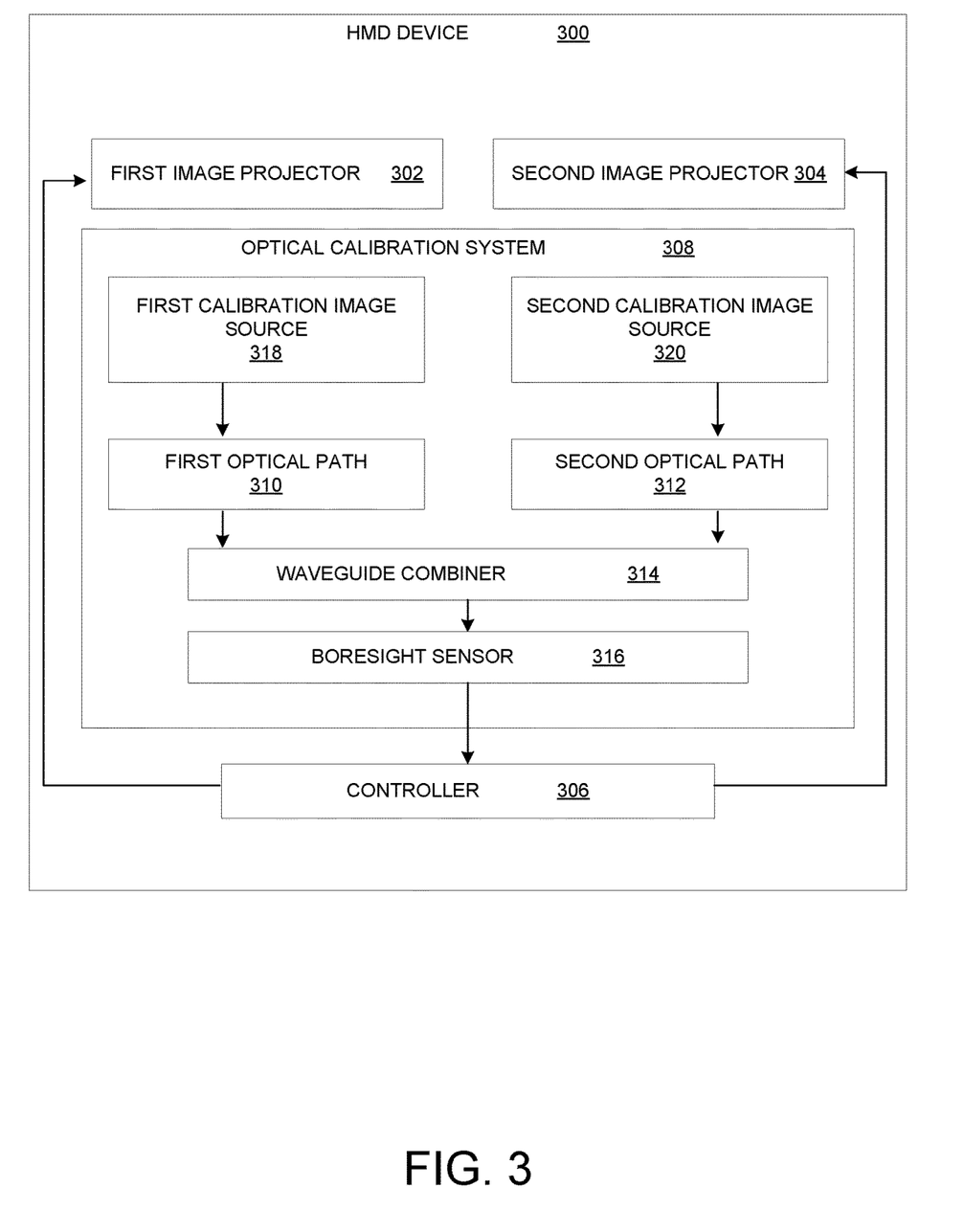
FIG. 3 shows a block diagram of another example HMD device.

FIG. 3 shows a block diagram of another example HMD device 300. HMD device 100 in some examples can be an implementation of HMD device 300. Similar to HMD device 200, HMD device 300 comprises a first image projector 302, a second image projector 304, a controller 306, and an optical calibration system 308 comprising a first optical path 310, a second optical path 312, a waveguide combiner 314, and a boresight sensor 316. Optical calibration system 308 further comprises a first calibration image source 318 similar to first calibration image source 208, and a second calibration image source 320 similar to second calibration image source 210. However, in contrast to HMD device 200, first calibration image source 318 is separate from first image projector 302, and second calibration image source 320 is separate from second image projector 304. Such a configuration may reduce a complexity of first image projector 302 and/or second image projector 304 compared to HMD device 200. First calibration image source 318 may be securely coupled with first image projector 302 (e.g. directly or via a rigid intermediate structure), and second calibration image source 320 may be securely coupled with second image projector 304, thereby helping to ensure that the first and second calibration images as sensed are indicative of an alignment of first image projector 302 and second image projector 304.

Figure 4:
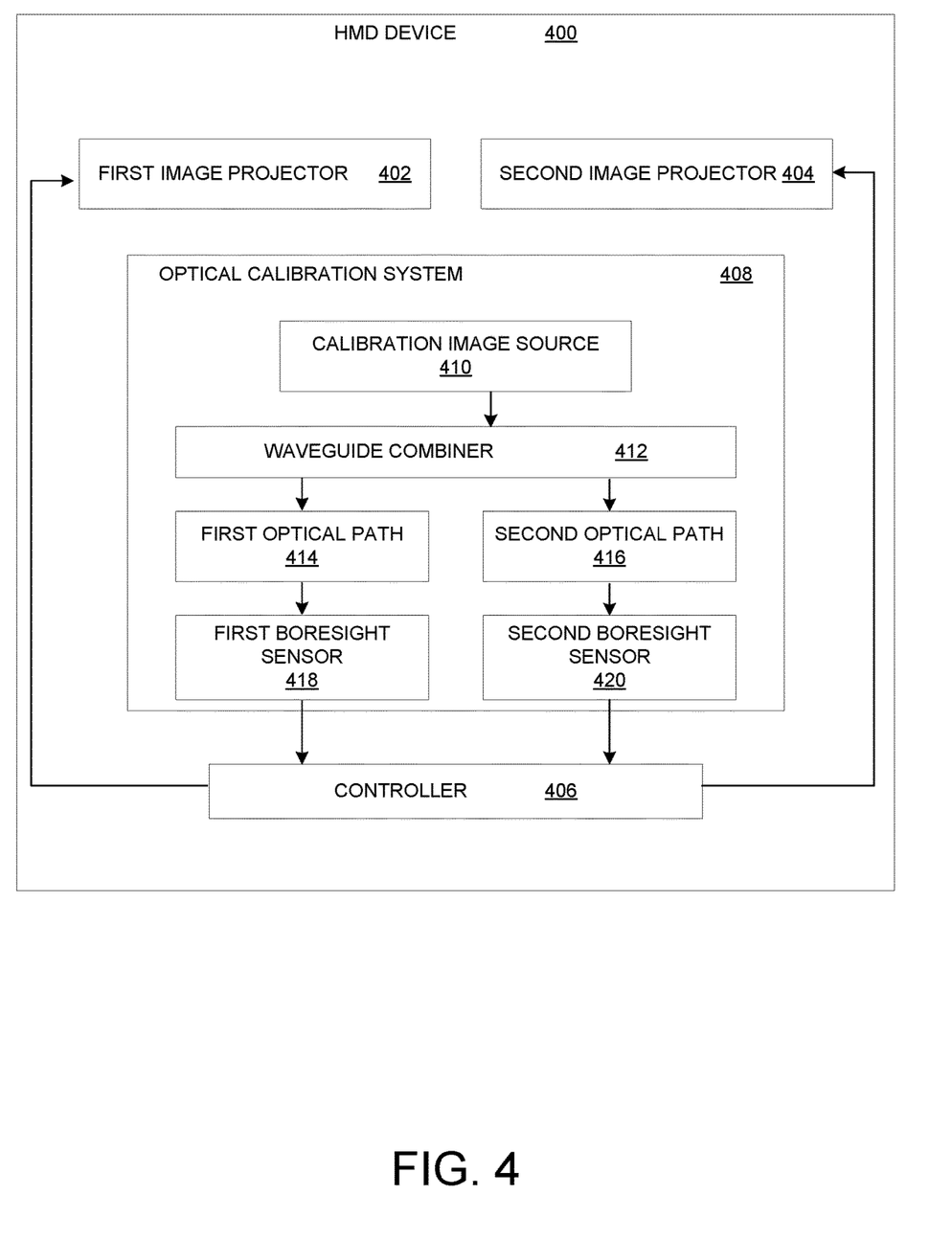
FIG. 4 shows a block diagram of another example HMD device.

FIG. 4 shows a block diagram of another HMD device 400. HMD device 100 in some examples can be an implementation of HMD device 400. Similar to HMD device 200, HMD device 400 comprises a first image projector 402, a second image projector 404, and a controller 406. However, in contrast to HMD device 200, HMD device 400 comprises an optical calibration system 408 including a calibration image source 410 configured to output a calibration image to a waveguide combiner 412 via a shared optical path. Waveguide combiner 412 directs the calibration image along both a first optical path 414 and a second optical path 416 respectively toward a first boresight sensor 418 configured to detect the calibration image from an output of first optical path 414 and a second boresight sensor 420 configured to detect the calibration image from an output of second optical path 416. While waveguide combiner 412 splits the calibration image transmission along two paths in this example, rather than combines first and second calibration images, the term "waveguide combiner" indicates that the first and second optical paths combine into a shared path within waveguide combiner 412, regardless of a direction in which calibration images are transmitted.

In this example, first boresight sensor 418 may be securely coupled with first image projector 402, and second boresight sensor 420 may be securely coupled with second image projector 404, thereby helping to ensure that the sensed locations of the calibration image as traveled along first optical path 414 and second optical path 416 are indicative of an alignment of first image projector 402 and second image projector 404.

Controller 406 may be configured to adjust one or more of the first image of the stereoscopic image pair and the second image of the stereoscopic image pair based at least in part on an output of one or more of first boresight sensor 418 and second boresight sensor 420. In some examples, controller 406 may be configured to detect a relative difference at which the calibration image is detected on each of first boresight sensor 418 and second boresight sensor 420 from expected locations, such as a factory-calibrated location. Such a configuration may help to maintain a relative alignment between the first image of the stereoscopic image pair and the second image of the stereoscopic image pair.

Figure 5:
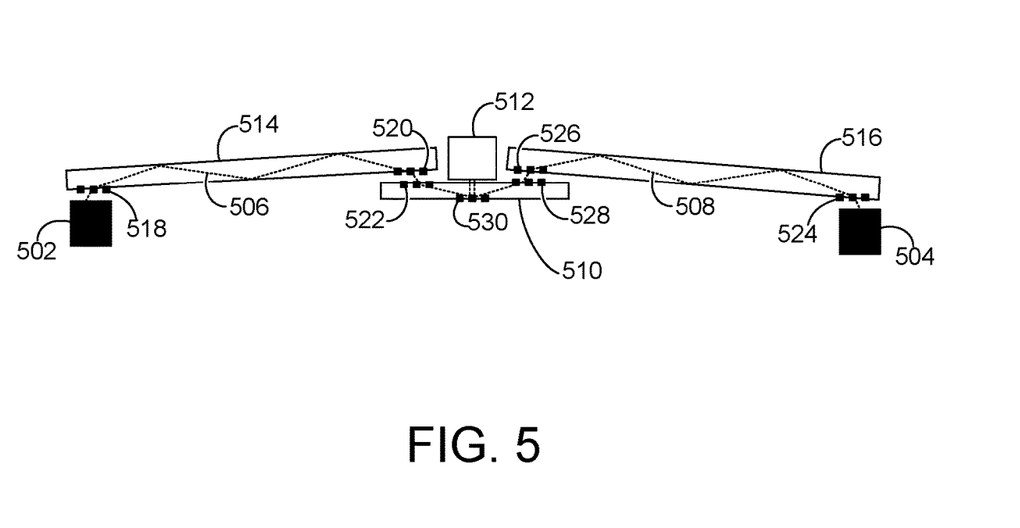
FIG. 5 shows an example optical calibration system.

FIG. 5 depicts an example optical calibration system 500 in a top view. HMD device 100, HMD device 200, and HMD device 300 can utilize optical calibration system 500 for example. Optical calibration system 500 comprises a first calibration image source 502, a second calibration image source 504, a first optical path 506, a second optical path 508, a waveguide combiner 510, and a boresight sensor 512. First calibration image source 502 is configured to output a first calibration image along first optical path 506. Similarly, second calibration image source 504 is configured to output a second calibration image along second optical path 508.

In the depicted example, a portion of first optical path 506 is located within a first image projection waveguide 514 and a portion of second optical path 508 is located within a second image projection waveguide 516. First image projection waveguide 514 comprises an input coupler 518 optically coupled to first calibration image source 502 and an output coupler 520 optically coupled to a first input coupler 522 of waveguide combiner 510. Second image projection waveguide 516 comprises an input coupler 524 optically coupled to second calibration image source 504 and an output coupler 526 optically coupled to a second input coupler 528 of waveguide combiner 510. The first calibration image traveling along first optical path 506 propagates via total internal reflection within first image projection waveguide 514. Similarly, the second calibration image traveling along second optical path 508 propagates via total internal reflection within second image projection waveguide 516.

First optical path 506 and second optical path 508 combine into a shared optical path in waveguide combiner 510. For example, waveguide combiner 510 comprises a common output coupler 530 configured to direct the first calibration and the second calibration image traveling along the shared optical path towards boresight sensor 512. Any suitable input and output coupling structures may be used, including reflective, refractive and diffractive structures. Example reflective and/or refractive structures comprise one or more prisms or mirrors. Example diffractive structures surface relief gratings and volume gratings (e.g. a volume Bragg grating).

Boresight sensor 512 may provide an output based on the first calibration image detected and the second calibration image detected. For example, boresight sensor 512 may output an image capturing both the first and second calibration images, different images capturing the first and second calibration images (e.g. where the first and second calibration images are time multiplexed), or may output a processed result of detecting the first and second calibration images (e.g. a relative offset between projector alignment). Any suitable processing may be performed on such images to determine an alignment of the first and second image projectors.

Waveguide combiner 510 may be formed from any suitable material. In some examples, waveguide combiner 510 may be formed from a glass material that is material transparent to wavelengths of light used for calibration images. In other examples, waveguide combiner 510 may be formed from a similarly transparent polymeric material, such as polymethylmethacrylate (PMMA) or other suitable optical plastic.

Figure 6:
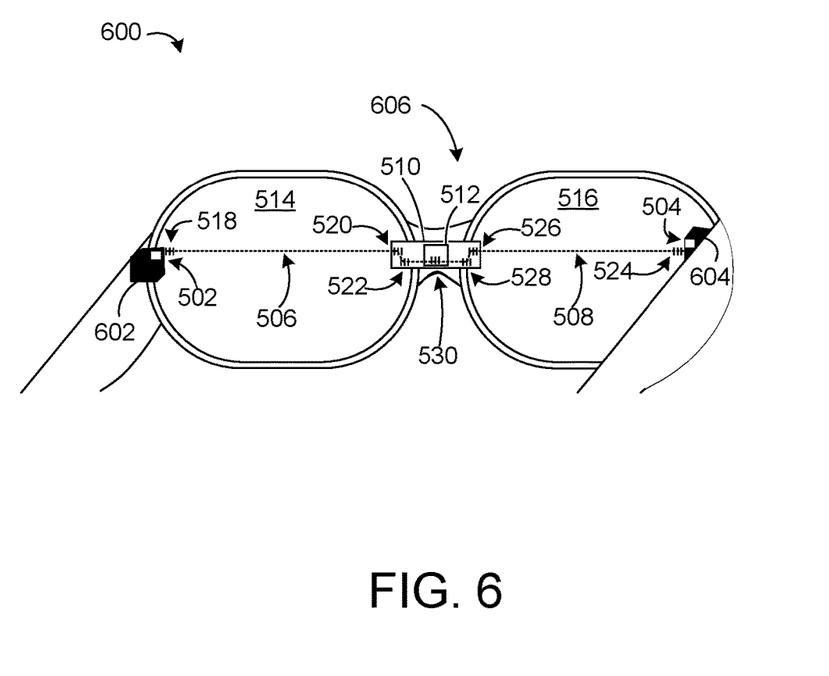
FIG. 6 shows an example HMD device that utilizes the optical calibration system of FIG. 5.

FIG. 6 depicts an example HMD device 600 that utilizes optical calibration system 500. HMD device 100, HMD device 200, and HMD device 300 are examples of HMD device 600. HMD device 600 comprises a first image projector 602, a second image projector 604, and the various components of optical calibration system 500 described above. First image projector 602 is configured to output a first image of a stereoscopic image pair, and second image projector 604 is configured to output a second image of the stereoscopic image pair.

As previously discussed, first calibration image source 502 and second calibration image source 504 can be integrated with first image projector 602 and second image projector 604, or can be securely coupled with first image projector 602 and second image projector 604, respectively. As such, first optical path 506 is indicative of an alignment of first image projector 602 and second optical path 508 is indicative of an alignment of second image projector 604. In the depicted example, waveguide combiner 510 is located in a nose bridge 606 of HMD device 600. As mentioned above, waveguide combiner 510 can have a more compact form factor than a prism, and thus may fit within the depicted form factor more easily than a prism.

Figure 7:
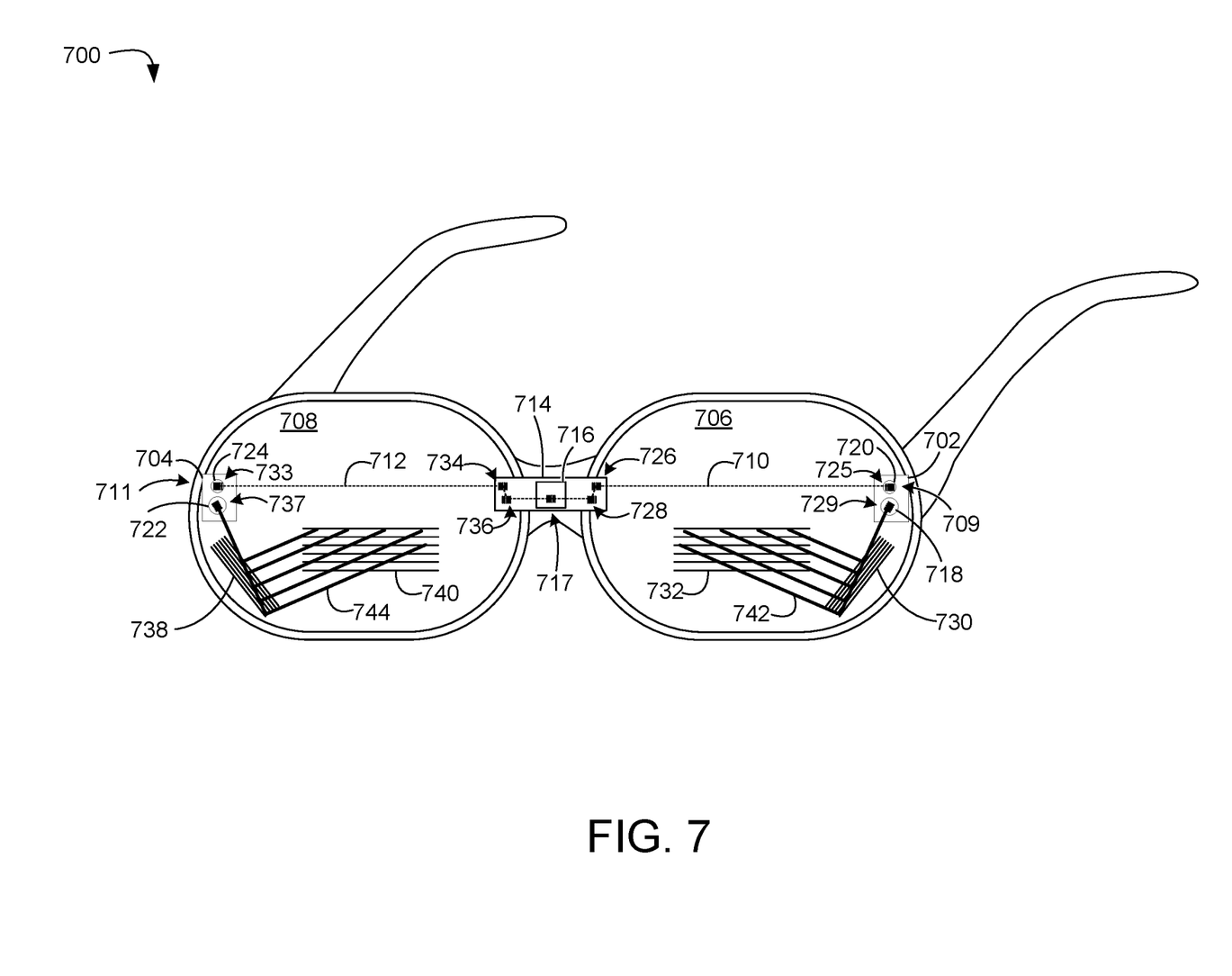
FIG. 7 shows an example HMD device that utilizes separate optical paths for stereoscopic image display and calibration image transmission.

As mentioned above, where a stereoscopic image and a visible light calibration image share at least a portion of an optical path through an image projection waveguide, there may be a risk that the calibration image is visible to a user. Thus, in some examples, an image projection waveguide may comprise separate paths for the calibration image and the stereoscopic image. FIG. 7 depicts an example HMD device 700 comprising separate optical paths within an image delivery waveguide for the stereoscopic image and the calibration image. HMD device 100, HMD device 200, and HMD device 600 may be examples of HMD device 700.

HMD device 700 comprises a first image projector 702, a second image projector 704, a first image projection waveguide 706, a second image projection waveguide 708, and an optical calibration system. The optical calibration system comprises a first calibration image source 709, a second calibration image source 711, a first optical path 710, a second optical path 712, a waveguide combiner 714, and a boresight sensor 716. First optical path 710 and second optical path 712 combine into a shared optical path within waveguide combiner 714. Boresight sensor 716 is configured to detect a first calibration image and a second calibration image output from waveguide combiner 714 via a common output coupler 717.

First image projector 702 comprises a stereoscopic image output 718 and a calibration image output 720. Likewise, second image projector 704 comprises a stereoscopic image output 722 and a calibration image output 724. A portion of first optical path 710 is located within first image projection waveguide 706, and a portion of second optical path 712 is located within second image projection waveguide 708.

First image projection waveguide 706 comprises a first input coupler 725 optically coupled to calibration image output 720, and a first output coupler 726 optically coupled to a first input coupler 728 of waveguide combiner 714. First image projection waveguide 706 further comprises a second input coupler 729 optically coupled to stereoscopic image output 718, a turning grating 730, and a second output coupler 732 configured to output the first image of the stereoscopic image pair from first image projection waveguide 706.

Similarly, second image projection waveguide 708 comprises a first input coupler 733 optically coupled to calibration image output 724, a first output coupler 734 optically coupled to a second input coupler 736 of waveguide combiner 714, a second input coupler 737 optically coupled to stereoscopic image output 722, a turning grating 738, and a second output coupler 740 configured to output the second image of the stereoscopic image pair from second image projection waveguide 708.

First calibration image source 709 is configured to output the first calibration image along first optical path 710. Likewise, second calibration image source 711 is configured to output the second calibration image along second optical path 712. Stereoscopic imagery output by first image projector 702 is transmitted along a third optical path 742. Similarly, stereoscopic imagery output by second image projector 704 is transmitted along a fourth optical path 744. In the depicted example, first optical path 710 is spatially separated from third optical path 742 and second output coupler 732. Likewise, second optical path 712 is spatially separated from fourth optical path 744 and second output coupler 740. This may help to avoid the first calibration image and the second calibration image from being noticeable by the user.

Figure 8:
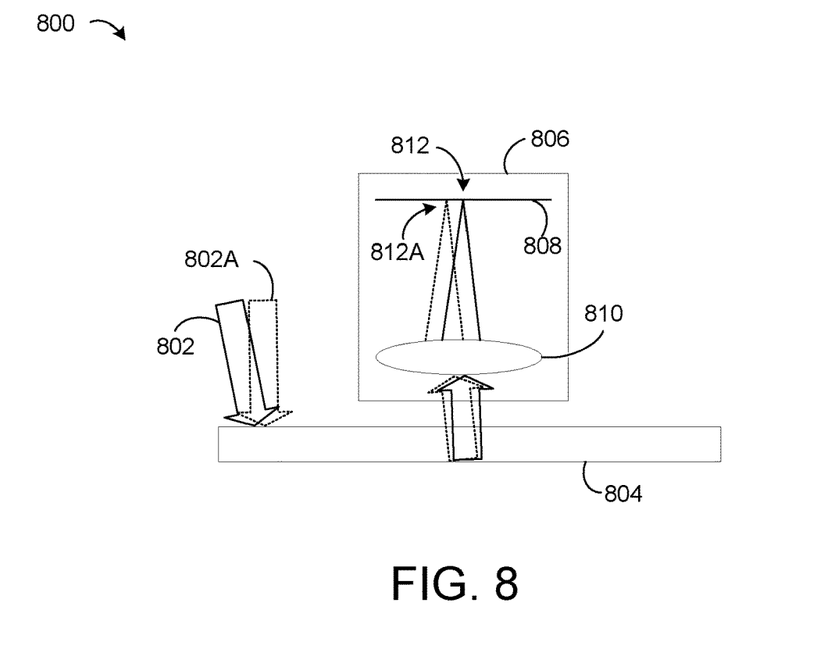
FIG. 8 schematically shows an example shift in a location of a calibration image arising from projector misalignment.

As previously mentioned, a bending of a pair of glasses of an HMD device may cause a change of a location of a calibration image on a boresight sensor. FIG. 8 schematically depicts such a change of the location of the calibration image detected by a common boresight sensor on an HMD device with separate image projectors. FIG. 8 may represent any suitable HMD device, such as HMD device 100, HMD device 200, HMD device 300, HMD device 600, or HMD device 700. When first and second image projectors are in alignment, calibration image light 802 is coupled into waveguide combiner 804 at a first angle and coupled out of waveguide combiner 804 towards boresight sensor 806. In the depicted example, boresight sensor 806 is illustrated as a camera comprising an image sensor 808 and a lens 810. Lens 810 is configured to focus the calibration image to a location 812 on image sensor 808. Lens 810 can be any suitable lens, such as a standard refractive lens, a wafer-level optics lens, or a diffractive optical element, as examples.

If first and second image projectors come out of alignment, an angle at which calibration image light 802A is coupled into waveguide combiner 804 changes. As a result, a location of the calibration image on image sensor 808 shifts to a shifted location 812A. This change may result from a bending of the HMD device as a result from thermal effects, physical shock, physical stress, and/or other factors. A controller receiving data from image sensor 808 (not shown in FIG. 8) may detect the change in location of the calibration image. In some examples, the change detected may comprise a change from an original factory calibration. In other examples, the change detected may comprise a relative change in location of a first calibration image relative to a location of a second calibration image (not shown in FIG. 8).

Figure 9:
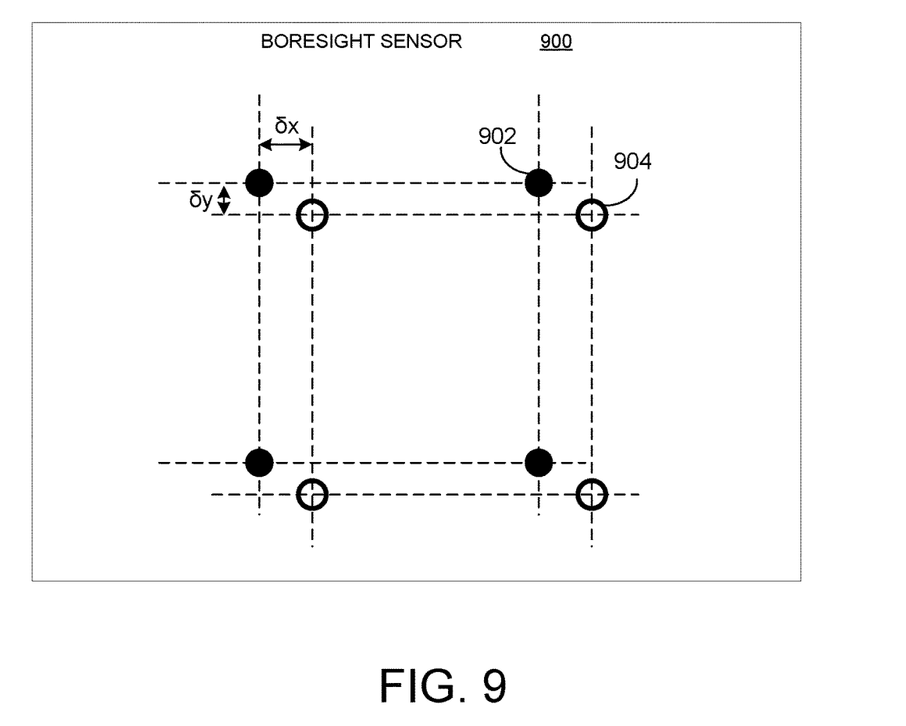
FIG. 9 schematically shows example first and second calibration images.

FIG. 9 illustrates examples of a first calibration image 902 and a second calibration image 904 as sensed by a boresight sensor 900. In the depicted example, first calibration image 902 and second calibration image 904 have different appearances. In other examples, first calibration image 902 and/or second calibration image 904 may comprise similar appearances. In such examples, first calibration image 902 and second calibration image 904 may be distinguishable by time multiplexing, for example. In the depicted example, a horizontal offset δx and a vertical offset δy between first calibration image 902 and second calibration image 904 can be detected by processing an image sensed by boresight sensor 900.

Figure 10:
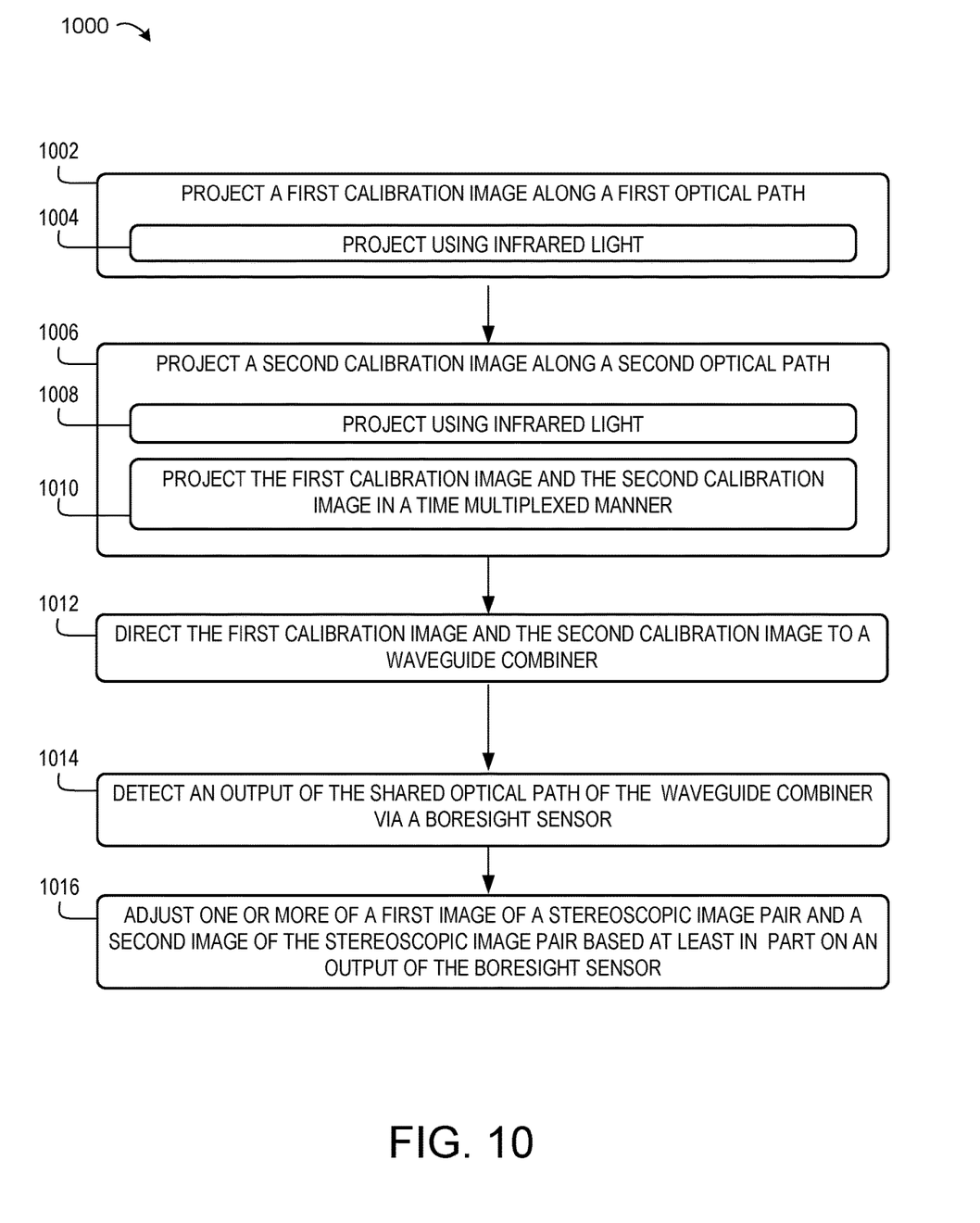
FIG. 10 shows a flow diagram of an example method of operating an optical calibration system.

FIG. 10 depicts a block diagram depicting an example method 1000 of operating an optical calibration system on an HMD device. Method 1000 may be performed on any suitable optical calibration system, such as those depicted in FIGS. 1-9. The optical calibration system comprises a first optical path, a second optical path, a waveguide combiner that combines the first optical and the second optical path into a shared optical path, and a boresight sensor.

Method 1000 comprises, at 1002, projecting a first calibration image along a first optical path. The first optical path indicates an alignment of a first image projector of the HMD device. In some examples, method 1000 comprises, at 1004, projecting the first calibration image using infrared light. In other examples, the first calibration image may be projected using visible light.

Method 1000 further comprises, at 1006, projecting a second calibration image along a second optical path. The second optical path indicates an alignment of a second image projector of the HMD device. In some examples, method 1000 comprises, at 1008, projecting the second calibration image using infrared light. In other examples, the second calibration image may be projected using visible light. In some examples, method 1000 comprises, at 1010, projecting the first calibration image and the second calibration image in a time multiplexed manner. In other examples, the first calibration image and the second calibration may be spatially separated and/or comprise different appearances relative to one another.

Method 1000 comprises, at 1012, directing the first calibration image and the second calibration image to a waveguide combiner in which the first optical path and the second optical path combine into a shared optical path. Method 1000 further comprises, at 1014, detecting an output of the shared optical path of the waveguide combiner via a boresight sensor. Method 1000 comprises, at 1016, adjusting one or more of a first image of a stereoscopic image pair and a second image of a stereoscopic image pair based at least in part on an output of the boresight sensor. In other examples, a calibration image can be projected along a shared optical path of the waveguide combiner, and the waveguide combiner can direct the calibration image along both the first optical path and the second optical path respectively toward a first boresight sensor and a second boresight sensor.

Thus, an HMD device may utilize an optical calibration system comprising a waveguide combiner as disclosed herein to help maintain a stereoscopic display system calibration in an HMD device having a comfortable form factor. In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
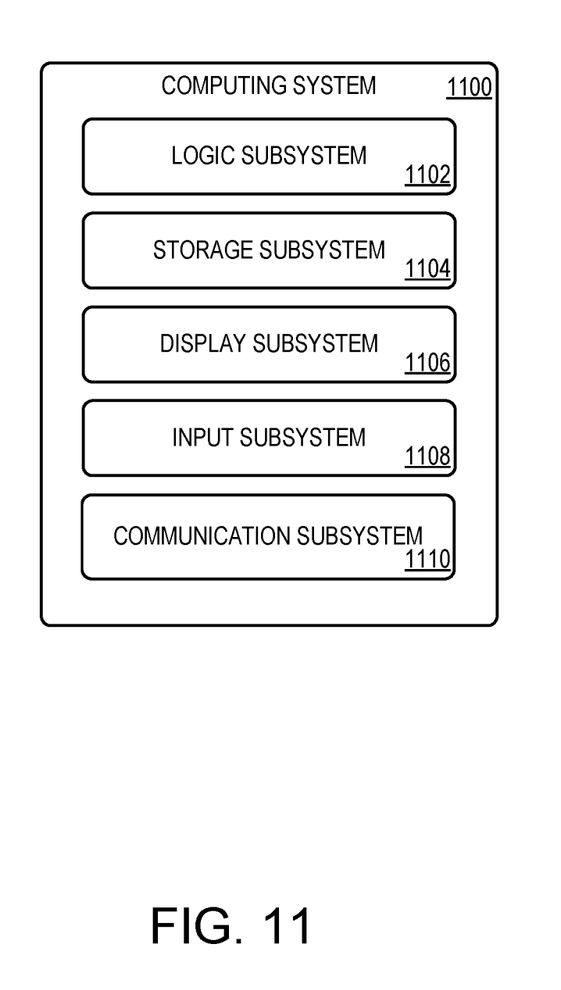
FIG. 11 shows a block diagram of an example computing system.

FIG. 11 schematically shows a non-limiting embodiment of a computing system 1100 that can enact one or more of the methods and processes described above. Computing system 1100 is shown in simplified form. Computing system 1100 may take the form of one or more personal computers, server computers, tablet computers, home-entertainment computers, network computing devices, gaming devices, mobile computing devices, mobile communication devices (e.g., smart phone), and/or other computing devices. HMD device 100, HMD device 200, HMD device 300, HMD device 400, HMD device 600, and HMD device 700 are examples of computing system 1100.

Computing system 1100 includes a logic subsystem 1102 and a storage subsystem 1104. Computing system 1100 may optionally include a display subsystem 1106, input subsystem 1108, communication subsystem 1110, and/or other components not shown in FIG. 11.

Logic subsystem 1102 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage subsystem 1104 includes one or more physical devices configured to hold instructions executable by the logic machine to implement the methods and processes described herein. When such methods and processes are implemented, the state of storage subsystem 1104 may be transformed—e.g., to hold different data.

Storage subsystem 1104 may include removable and/or built-in devices. Storage subsystem 1104 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1104 may include volatile, nonvolatile, dynamic, static, read/write, read-only, random-access, sequential-access, location-addressable, file-addressable, and/or content-addressable devices.

It will be appreciated that storage subsystem 1104 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 1102 and storage subsystem 1104 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1106 may be used to present a visual representation of data held by storage subsystem 1104. This visual representation may take the form of a graphical user interface (GUI). As the herein described methods and processes change the data held by the storage machine, and thus transform the state of the storage machine, the state of display subsystem 1106 may likewise be transformed to visually represent changes in the underlying data. Display subsystem 1106 may include one or more display devices utilizing virtually any type of technology. Such display devices may be combined with logic subsystem 1102 and/or storage subsystem 1104 in a shared enclosure, or such display devices may be peripheral display devices.

When included, input subsystem 1108 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1110 may be configured to communicatively couple computing system 1100 with one or more other computing devices. Communication subsystem 1110 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1100 to send and/or receive messages to and/or from other devices via a network such as the Internet.

Another example provides a head mounted display (HMD) device comprising a first image projector configured to project a first image of a stereoscopic image pair, a second image projector configured to project a second image of the stereoscopic image pair, an optical calibration system comprising a first optical path indicative of an alignment of the first image projector, a second optical path indicative of an alignment of the second image projector, a waveguide combiner in which the first optical path and the second optical path combine into a shared optical path, and one or more boresight sensors, each boresight sensor configured to detect calibration image light traveling along one or more of the first optical path or the second optical path, and a controller configured to adjust one or more of the first image of the stereoscopic image pair and the second image of the stereoscopic image pair based at least in part on an output of the one or more boresight sensors. In some such examples, the one or more boresight sensors alternatively or additionally comprises a sensor configured to detect a first calibration image and a second calibration image delivered via the shared optical path. In some such examples, the sensor alternatively or additionally comprises one or more of a camera, a quadrant diode detector, lensless camera or an angular sensitive pixel detector. In some such examples, the optical calibration system alternatively or additionally comprises a first calibration image source configured to output the first calibration image along the first optical path, and a second calibration image source configured to output the second calibration image along the second optical path. In some such examples, the first calibration image source alternatively or additionally comprises a calibration image output of the first image projector, and the second calibration image source alternatively or additionally comprises a calibration image output of the second image projector. In some such examples, the first calibration image source is alternatively or additionally separate from the first image projector, and the second calibration image source is alternatively or additionally separate from the second image projector. In some such examples, the controller is alternatively or additionally configured to control projection of the first calibration image and the second calibration image in a time multiplexed manner. In some such examples, the first calibration image source and the second calibration image source are alternatively or additionally configured to output infrared light. In some such examples, the optical calibration system alternatively or additionally comprises a calibration image source configured to output a calibration image along the shared optical path, and the one or more boresight sensors alternatively or additionally comprises a first boresight sensor configured to detect the calibration image output from the first optical path, and a second boresight sensor configured to detect the calibration image output from the second optical path. In some such examples, the device is alternatively or additionally configured as a pair of glasses, and wherein the waveguide combiner is located in a nose bridge of the pair of glasses. In some such examples, the device alternatively or additionally comprises an image projection waveguide configured to transmit at least the first image of the stereoscopic image pair for viewing, and a portion of the first optical path of the optical calibration system is alternatively or additionally located within the image projection waveguide.

Another example provides a head mounted display (HMD) device comprising a first image projector configured to project a first image of a stereoscopic image pair, a second image projector configured to project a second image of the stereoscopic image pair, an optical calibration system comprising a first calibration image source configured to output a first calibration image along a first optical path indicative of an alignment of the first image projector, a second calibration image source configured to output a second calibration image along a second optical path indicative of an alignment of the second image projector, a waveguide combiner in which the first optical path and the second optical path combine into a shared optical path, the waveguide combiner being positioned in a nose bridge of the HMD device, and a boresight sensor optically coupled to an output coupler of the waveguide combiner, the boresight sensor configured to detect the first calibration image and the second calibration image, and a controller configured to adjust one or more of the first image of the stereoscopic image pair and the second image of the stereoscopic image pair based at least in part on an output of the boresight sensor. In some such examples, the boresight sensor alternatively or additionally comprises one or more of a camera, a quadrant diode detector, lensless camera or an angular sensitive pixel detector. In some such examples, the first calibration image source and the second calibration image source are alternatively or additionally configured to output infrared light. In some such examples, the device is alternatively or additionally configured as a pair of glasses. In some such examples, the device alternatively or additionally comprises an image projection waveguide configured to transmit at least the first image of the stereoscopic image pair for viewing, and a portion of the first optical path of the optical calibration system is alternatively or additionally located within the image projection waveguide. In some such examples, the first optical path is alternatively or additionally spatially separated from an optical path configured for transmission of the first image of the stereoscopic image pair.

Another example provides a method enacted on a head mounted display (HMD) device comprising a first image projector, a second image projector, a controller, and an optical calibration system comprising a first optical path, a second optical path, a waveguide combiner that combines the first optical path and the second optical path into a shared optical path, and a boresight sensor, the method comprising projecting a first calibration image along the first optical path, projecting a second calibration image along the second optical path, directing the first calibration image and the second calibration image to the waveguide combiner, detecting an output of the shared optical path of the waveguide combiner via the boresight sensor, the output of the shared optical path comprising the first calibration image and the second calibration image, and adjusting one or more of a first image of a stereoscopic image pair and a second image of the stereoscopic image pair based at least in part on an output of the boresight sensor. In some such examples, projecting the first calibration image and projecting the second calibration image alternatively or additionally comprises projecting infrared light. In some such examples, projecting the first calibration image and projecting the second calibration image alternatively or additionally comprises projecting the first calibration image and the second calibration image in a time multiplexed manner.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A head mounted display (HMD) device comprising:
a first image projection waveguide comprising a first optical path configured to transmit a first image for viewing;
a second image projection waveguide comprising a second optical path configured to transmit a second image for viewing;
an optical calibration system comprising
a third optical path configured to transmit a first calibration image, a portion of the third optical path being located in the first image projection waveguide and separate from the first optical path,
a fourth optical path configured to transmit a second calibration image, a portion of the fourth optical path being located in the second image projection waveguide and separate from the second optical path,
a waveguide combiner in which the third optical path and the fourth optical path combine into a shared optical path, and
a boresight sensor optically coupled to a common output coupler of the waveguide combiner, the boresight sensor configured to detect light traveling along the third optical path or the fourth optical path; and
a controller configured to adjust one or more of the first image or the second image based at least in part on an output of the boresight sensor.

2. The device of claim 1, wherein the boresight sensor comprises one or more of a camera, a quadrant diode detector, a lensless camera or an angular sensitive pixel detector.

3. The device of claim 1, further comprising a first image projector optically coupled to a first input coupler of the first image projection waveguide on the first optical path, and wherein the optical calibration system further comprises a first calibration image source optically coupled to a second input coupler of the first image projection waveguide on the third optical path.

4. The device of claim 3, wherein the first calibration image source comprises a calibration image output of the first image projector.

5. The device of claim 3, wherein the first calibration image source is separate from the first image projector.

6. The device of claim 1, wherein the first image projection waveguide comprises a first output coupler on the first optical path, and a second output coupler on the third optical path, the second output coupler being optically coupled to an input coupler of the waveguide combiner.

7. The device of claim 1, wherein the device is configured as a pair of glasses, and wherein the waveguide combiner is located in a nose bridge of the pair of glasses.

8. A head mounted display (HMD) device comprising:
a first image projection waveguide comprising a first optical path configured to transmit a first image for viewing;
a second image projection waveguide comprising a second optical path configured to transmit a second image for viewing; and
an optical calibration system comprising
a third optical path configured to transmit a first calibration image, a portion of the third optical path being located in the first image projection waveguide and separate from the first optical path,
a fourth optical path configured to transmit a second calibration image, a portion of the fourth optical path being located in the second image projection waveguide and separate from the second optical path,
a waveguide combiner in which the third optical path and the fourth optical path combine into a shared optical path, the waveguide combiner being positioned in a nose bridge of the HMD device, and
a boresight sensor optically coupled to a common output coupler of the waveguide combiner, the boresight sensor configured to detect light traveling along the third optical path or the fourth optical path.

9. The device of claim 8, further comprising a controller configured to adjust one or more of the first image or the second image based at least in part on an output of the boresight sensor.

10. The device of claim 8, wherein the boresight sensor comprises one or more of a camera, a quadrant diode detector, a lensless camera or an angular sensitive pixel detector.

11. The device of claim 8, further comprising a first image projector optically coupled to a first input coupler of the first image projection waveguide on the first optical path, and wherein the optical calibration system further comprises a first calibration image source optically coupled to a second input coupler of the first image projection waveguide on the third optical path.

12. The device of claim 11, wherein the first calibration image source comprises a calibration image output of the first image projector.

13. The device of claim 11, wherein the first calibration image source is separate from the first image projector.

14. The device of claim 8, wherein the device is configured as a pair of glasses.

15. A method enacted on a head mounted display (HMD) device comprising a first image projection waveguide including a first optical path, a second image projection waveguide including a second optical path, and an optical calibration system comprising a third optical path, a fourth optical path, a waveguide combiner, and a boresight sensor, the method comprising:

projecting a first calibration image along the third optical path that is spatially separated from the first optical path within the first image projection waveguide;
projecting a second calibration image along the fourth optical path that is spatially separated from the second optical path within the second image projection waveguide;
directing the first calibration image and the second calibration image to the waveguide combiner that combines the third optical path and the fourth optical path into a shared optical path;
detecting an output of the shared optical path of the waveguide combiner via the boresight sensor, the output of the shared optical path comprising one or more of the first calibration image or the second calibration image; and
adjusting one or more of a first image along the first optical path or a second image along the second optical path based at least in part on an output of the boresight sensor.

16. The method of claim 15, wherein projecting the first calibration image and projecting the second calibration image comprises projecting the first calibration image and the second calibration image in a time multiplexed manner.

17. The method of claim 15, wherein the HMD device further includes an image projector comprising a calibration image output and a stereoscopic image output, and wherein projecting the first calibration image uses the calibration image output, and adjusting one or more of the first image along the first optical path or the second image along the second optical path comprises adjusting the first image using the stereoscopic image output.

* * * * *